United States Patent
Eimer et al.

[11] Patent Number: 6,030,525
[45] Date of Patent: Feb. 29, 2000

[54] COST-ORIENTATED CONTROL OF A REGENERABLE FILTER

[75] Inventors: Klaus Eimer; Dieter Patzig, both of Ratingen; Hans. W. Schildmann, Heilingenhaus, all of Germany

[73] Assignee: Taprogge Gesellschaft mbH, Wetter, Germany

[21] Appl. No.: 08/908,645

[22] Filed: Aug. 7, 1997

Related U.S. Application Data

[63] Continuation of application No. PCT/EP96/00563, Feb. 9, 1996.

[51] Int. Cl.$^7$ .................................................. B01D 21/24
[52] U.S. Cl. ........................... 210/98; 210/106; 210/143; 210/175; 137/15
[58] Field of Search ............................. 210/98, 103, 106, 210/138, 143, 175, 181, 791, 108; 137/239, 15, 118.04

[56] References Cited

U.S. PATENT DOCUMENTS

| | | | |
|---|---|---|---|
| 4,692,253 | 9/1987 | Otake et al. | 210/791 |
| 5,484,536 | 1/1996 | Yamaguchi et al. | 210/741 |

*Primary Examiner*—W. L. Walker
*Assistant Examiner*—Terry K. Cecil
*Attorney, Agent, or Firm*—R. William Beard, Jr.; Frohwitter

[57] ABSTRACT

A process of cost-optimized control of a mechanical filter that is situated in a flow of cooling water driven by a cooling water pump in a heat exchanger and that can be regenerated by means of a flushing system involves the following steps: at least one measurement value is determined from which the filter's current degree of soiling is derived and this value is fed to a flush command generator; by means of the functional dependencies and/or data stored in the flush command generator a first and a second performance loss are calculated at predeterminable intervals, the first performance loss comprising the performance loss due to the filter's degree of soiling and the second performance loss comprising the performance loss due to a flushing operation at the current degree of soiling; from the progression over time of the first computed performance loss are determined the total performance losses since the last regeneration as a result of the soiling of the filter; a current second energy loss is calculated for each regenerating operation, containing the second performance loss multiplied by the duration of the regenerating operation; each current second energy loss is added in to the currently accumulated total energy loss and the sum is divided by the time expired since the last regeneration, including the time required for a regenerating operation; the progression over time of this quotient is monitored and a regenerating operation is triggered when this quotient has gone through a minimum and is rising again.

26 Claims, 3 Drawing Sheets

COST-ORIENTATED CONTROL OF A REGENERABLE FILTER

CONTINUATION STATEMENT

This application is a continuation of PCT International Application No. PCT/EP96/00563 filed Feb. 9, 1996, still pending.

BACKGROUND OF THE INVENTION

A method and device for cost-optimised control of a regenerable filter in a water circuit of a heat exchanger.

The present invention relates to a method for cost-orientated control of a regenerable mechanical filter, in particular for contaminants in the cooling water flow preceding heat exchangers, with:

- a filter arranged between the cooling water pump and heat exchanger in the path of the cooling water supply line, with a filter housing, at least one filter element covering the cross-section of the housing, at least one cleansing device acting upon the filter element and flushing away the contaminants, and at least one flush water line which can be connected to a flushing means and is used for removal of the contaminants flushed out,
- at least one or more sensor(s) monitoring the operating condition of the installation, the signal lines of which output signals (S1, S2 . . . Sn) which indicate the operating condition of the whole installation composed of a cooling water pump, filter and heat exchanger, impaired by the fouling of the filter,
- a flush command generator which is connected on the one hand with the signal lines providing the signal (S1, S2 . . . Sn) and on the other hand, on its command line, makes the flush command (Sa) for flushing the filter switchable,
- a flushing process control, which is connected to the command line of the flush command generator, so that when there is a switch position signalling the flush command, the command line makes the flushing process practicable by opening the flushing means and by actuation of the cleansing device.

Installations of this type have been known for a long time. Thus, an installation of the known type is described in the publication by A. Lange entitled "Kosteinsparungen durch verbesserten Betrieb der Kühlrohr-Reinigungsanlage, Einsatz von Kühlwasserfiltern und einer neuartigen Kondensatorüberwachung" [Cost savings by improved operation of cooling tube cleaning installations, use of cooling water filters and novel condenser monitoring] in VGB Kraftwerkstechnik 70 (1990), Volume 8, pages 681 to 688. The filter is installed in the cooling water supply line preceding the heat exchanger, in this case a turbine condenser for condensing the vapour leaving a turbine. The cooling water pump necessary for the process is arranged upstream of the filter, but is not shown. The filter has a filter element, called the filter insert, covering the housing cross-section, a cleansing device acting upon some areas of the filter element and flushing out the contaminants, called a rotor, with rotor drive, and a flush water line penetrating the walls of the housing, which is connected downstream of the heat exchanger to the cooling water drainage line and can be connected to a waste water means, called a flushing means, and is for removal of the flushed out contaminants.

The filter installation has a sensor monitoring the operating condition of the installation, described as a pressure differential measurement system, the signal line of which provides an electrical signal which indicates the increased pressure differential of the filter caused by the fouling of the filter and thereby the impaired operating condition of the whole installation composed of a cooling water pump, filter and heat exchanger.

A flush command generator, which on the one hand is connected to the signal line of the sensor providing the signal and on the other hand transmits the flush command for flushing the filter to a flush process controller for opening the flushing means and actuating the cleansing device, is combined together with the flush process control in a unit described as a control cabinet.

The control of the installation is done in that the pressure differential measuring system monitors the degree of fouling of the filter means. If a pressure differential of the filter, measured by the pressure differential system, reaches a set limit value, the flush command generator provides the flush command to the flush process control, which switches on the rotor drive and opens the waste water means.

A further embodiment of the known control of the installations of the known type described is described in Japanese document 61-38000. The filter element is in this case cylindrical and is composed, for example, from perforated sheet metal. The cleansing device is a regulator flap arranged directly in front of the filter inlet, which, during filter flushing produces a high-speed turbulent ring flow, by means of which the contaminant particles are lifted from the filter element and transported to the flush water line. The installation has a pressure differential measuring system as the sensors monitoring the operating condition of the installation, and a cooling water volume flow measuring system, the signal lines of which provide electrical signals which indicate the impaired operating state caused by the fouling of the filter of the whole installation composed of a cooling water pump, filter and heat exchanger. The flush command generator is composed of a function memory and a comparator and is connected to the signal lines of the pressure differential measuring system and of the cooling water volume flow measuring system. The flush process control is connected to the command line of the flush command generator. The method for controlling the installation is that in the comparator the current pressure differential of the filter is compared with a set value dependent on the cooling water volume flow pre-determined in the function memory, and when the set value is exceeded the flush command for flushing the filter is given electrically to the flush process control, which in turn initiates filter flushing by opening the flushing means and actuation of the regulator flap.

Installations also belong to the prior art in which the flush water line is not connected to the cooling water drain line, but instead to an open waste water channel or a waste water store. The filter element can be configured in very different ways, for example extending in a two-dimensional manner as a so-called surface filter (for example made from stamped, perforated sheet metal and formed as a planar surface or cylinder or spherical cup) or as a so-called deep-bed filter composed, for example, of wound thread or from a pile of sand or activated charcoal. The cleansing device can be a back flush rotor, as in the described publication by A. Lange, a regulator flap as in the described Japanese publication 61-38000, or also be composed of several shut-off flaps, with the aid of which parts of the filter element are separated one after another from the flow of cooling water on the inlet side and are connected to the flush water line, wherein there is a back flushing with cleansed cooling water, from the filter outlet through the filter element, of the part of the filter element shut off. The filter housing can also be composed of several individual housings which can be separated from the common cooling water supply line one after another by means of shutting-off means at the filter inlet for flushing, and can be connected to a common flush water line by means of flushing means. The present invention shall relate to all regenerable mechanical filters for liquids known per se, described and not described, and not be limited to cooling water installations.

Apart from the fact that it is also known to generate the flush command manually by means of a push button or by means of a timer, it is common to the known methods for controlling a regenerable mechanical filter that the flush command for flushing the filter is generated when the pressure differential of the filter or of the filter element, measured by a pressure differential measuring system, exceeds a limit value or, in an improved embodiment, a limit value pre-determined in fixed dependency upon the current cooling water volume flow, wherein the cooling water volume flow can be measured with different types of sensors.

The pressure loss of the filter insert increases because of the fouling of said filter means with contaminants from the flow of cooling water. In the case of cooling water pumps with an unregulated drive this causes a reduction in the cooling water volume flow, which causes a reduced thermal output at the heat exchanger. In the case of cooling water pumps with a regulated drive, or with blade adjustment, this can partly be compensated for by increased pump output. As a whole, the fouling of the filter means causes reduced efficiency of the whole installation composed of a cooling water pump, filter and heat exchanger, which is indicated by the pressure differential measuring system and possibly by the cooling water volume flow measuring system, being the sensors monitoring the operating condition of the installation, and is described as the "power loss through filter fouling". The filter should therefore be flushed when there is as little fouling of the filter means as possible, and therefore as often as possible in order to obtain as little average power loss through filter fouling as possible.

However, when the fouled filter is flushed, the cooling water volume flow supplied to the heat exchanger is reduced by the amount of the flush water flow. The corresponding thermal effect is lost by the heat exchanger. Overall, the filter flushing causes impairment to the efficiency of the whole installation composed of the cooling water pump, filter and heat exchanger which is described as the "power loss through filter flushing". The filter should therefore be flushed as little as possible in order to obtain a low power loss through filter flushing.

With the known methods for controlling the installations described for the mechanical cleaning of liquids, it is disadvantageous that:

when a flush point is set high in order to obtain little filter flushing, high power losses through filter fouling occur, the other hand, however, with a flush point set low to obtain a low power loss through filter fouling, frequent filter flushing with correspondingly high power losses can occur.

With frequent filter flushing the correspondingly high actuating energy and the rapid wearing out of the cleansing device and of the flush water means are disadvantageous.

The disadvantage of the known device is thus essentially that the flush point is set in a fixed manner or in fixed dependency upon the cooling water volume flow, and this does not take into consideration the periodically varying concentration of the contaminants in the cooling water flow, and thereby when there is low contamination a disproportionately high "power loss through filter fouling" occurs and when there is high contamination a disproportionately high "power loss through filter flushing" occurs. Taken as a whole, it is disadvantageous that the determination of the flush point takes place as a rule according to technical standpoints and not according to possibly changing energy criteria and economic criteria associated with these.

SUMMARY OF THE INVENTION

The object of the present invention is therefore to provide a method for cost-orientated control of a regenerable mechanical filter for contaminants in the cooling water flow preceding heat exchangers. In particular, the necessary flushing of the filter has not to take place at a fixed flush point or according to a fixed dependency of the flush point upon the cooling water flow. Instead, the filter has to be flushed when it is beneficial from an energy and economical point of view taking into account varying operating conditions. Accordingly, the flush point must be adjusted automatically to the changing concentration of contaminants in the cooling water flow. The provision of an appropriate device for implementing the method is also the object of the invention.

According to one aspect of the invention, there is provided a method for controlling a mechanical filter (5) which is regenerable by means of a flushing device and which is in a cooling water flow, driven by a cooling water pump (4), of a heat exchanger (1), the method comprising:

a. sensing at least one measured value, from which a current degree of fouling of the filter (5) can be deduced, and supplying the value to a flush command generator (14);

b. calculating by at least one functional correlation stored in the flush command generator (14), in pre-determined time intervals respectively a first ($\Delta N1$) and a second ($\Delta N2$) power loss, wherein the first power loss ($\Delta N1$) comprises the power loss in the cooling water pump (4) and in the heat exchanger (1) caused by the degree of fouling of the filter (5), and the second power loss ($\Delta N2$) comprises the power loss caused by a flushing procedure with a current degree of fouling;

c. determining from the development over time of the first calculated power loss ($\Delta N1$) respectively the total energy losses ($\Delta E1$) caused as a whole by the fouling of the filter since the last regeneration;

d. calculating a current second energy loss ($\Delta E2$) respectively for a flushing procedure which comprises the second power loss multiplied by the duration of the regeneration ($\Delta T2$);

e. adding the current calculated second energy loss ($\Delta E2$) to the respective current total energy loss ($\Delta E1$) accumulated, and dividing the sum by the time elapsed ($\Delta T1$) since the last regeneration inclusive of the time ($\Delta T2$) needed for a regeneration procedure;

f. monitoring the development over time of these quotients ($[\Delta E1+\Delta E2]/[\Delta T1+\Delta T2]$) and triggering a regeneration procedure when the quotient has passed through a minimum and is increasing again.

According to a further aspect of the invention, there is provided a device for controlling a mechanical filter (5) which is regenerable by means of a flushing device and which is in a cooling water flow driven by a cooling water pump (4) of a heat exchanger (1), wherein said device comprises the following components:

a flush command generator (14) with an input unit (20) and non-volatile memories (22) for functional correlations of parameters, at least one sensor (12; 18; 19) for receiving measured values from which, at predetermined intervals, respectively a first power loss (ΔN1) which is caused by the fouling of the filter can be calculated as a change in output of the cooling water pump (4) and as a change in output of the heat exchanger (1), means (23) for calculating of the total energy loss (ΔE1) calculated from the development over time of the first power losses (AN I) since the last regeneration of the filter (5), means (23) for calculating the current energy loss (ΔE2) to be expected to be caused by a regeneration procedure as a change in output in the cooling water pump (4) and as a change in output of the heat exchanger (1), means (23) for recognising when the current sum of the total energy loss (ΔE1) and of the energy loss (ΔE2) expected with a regeneration divided by the time since the last regeneration inclusive of the regeneration time (ΔT1+ΔT2) to be expected has reached a minimum or has exceeded it, and for triggering a regeneration process resulting from this.

An essential feature of the invention is that the effects of the filter fouling on the power and the operating costs of the whole installation are taken into account in the considerations for determining the flush point and are weighed against the power consumption and possibly also against the operating costs of the filter flushing itself, so that in total a minimum of power loss and operating costs is obtained.

In accordance with the invention at least one measured value, from which the state of fouling of the filter can be deduced, is supplied to a flush command generator and is determined from the measured value the current state of fouling. These measured values can be a pressure differential, the through-flow rate of cooling water, the speed or blade setting of the cooling water pump or other measured values. Using the data and/or functional dependencies stored in the flush command generator, a first power loss causes the differential pressure to be increased due to the fouled filter and the cooling water volume flow reduced thereby as a sum of the change in the output of the cooling water pump and the reduced thermal output of the heat exchanger, and a second power loss and other operating costs which occur when the fouled filter is flushed are compared with one another. At the command line, the flush command is activated for the point in time from which the flushing of the filter is overall more energy and cost saving than further operation without flushing. An essential component of the invention is that with cost-orientated control according to the invention of the filter, taking into account the loss in power of the cooling water pump caused by filter fouling and filter flushing, and the reduced thermal output of the heat exchanger, in an unexpected manner a far more frequent flushing is produced as a rule than with operation according to the prior art with a fixed flush point. Comparative calculations have shown that in this way significant energy and cost savings are possible.

The method according to the invention can be combined with very different sensors and signals (S1, S2 ... Sn) which indicate the impaired operating condition of the whole installation composed of a cooling water pump, filter and heat exchanger caused by filter fouling. In a preferred embodiment of the invention however, the pressure differential (ΔP) of the filter or in another preferred embodiment the pressure differential (ΔP) of the filter and of the cooling water volume flow (V) is used.

The power losses through filter fouling and filter flushing in dependence upon the pressure differential (ΔP) of the filter and the cooling water volume flow (V) are dependent upon numerous parameters of the whole installation such as, for example, characteristic curves of the cooling water pump, hydraulic characteristic curves and thermal data of the heat exchanger, hydraulic characteristic curves of the filter and of the flush water lines and so forth, which are in a complex relationship with one another. The determination of the dependencies is, in an unexpected manner, not complex, when the following concept according to the invention is followed: For the individual specific whole installations, there are then only six constant values (d; e; f; g; h; i) to be determined, which establish the first and the second function (ΔN1=f(ΔP; V) and ΔN2=f (ΔP; V)) with sufficient accuracy as straight lines.

In a further embodiment of the invention, in which the cooling water volume flow (V) is not provided as an electrical signal, when there is a change in (V) for operational reasons the changed values are manually input using a keyboard. In another preferred embodiment of the invention, changes to the cooling water volume flow (V) are determined by evaluation of the change in pressure differential of the clean filter (ΔPc) in each case directly after completion of the flushing process. With this, the clean filter is regarded as a kind of measuring diaphragm with a constant pressure loss correction value, from the change in pressure differential of which the changes in the cooling water volume flow can be deduced.

BRIEF DESCRIPTION OF THE DRAWINGS

The operation of the method according to the invention for controlling an installation for the mechanical cleansing of liquids is described in FIGS. 1 to 4. In these is shown in:

FIG. 1 a known installation for the mechanical cleansing of liquids, shown as a flow diagram, FIG. 2 an example of a development of the power losses ΔN1 and ΔN2 as functions of the pressure differential ΔP and of the cooling water volume flow (V), FIG. 3 the representation of the power and energy losses over time and of the minimum average power loss ΔNm (Min) as the favoured flush point, FIG. 4 a device for implementation of the method according to the invention, shown schematically.

DETAILED DESCRIPTION OF THE INVENTION

Figure 1:
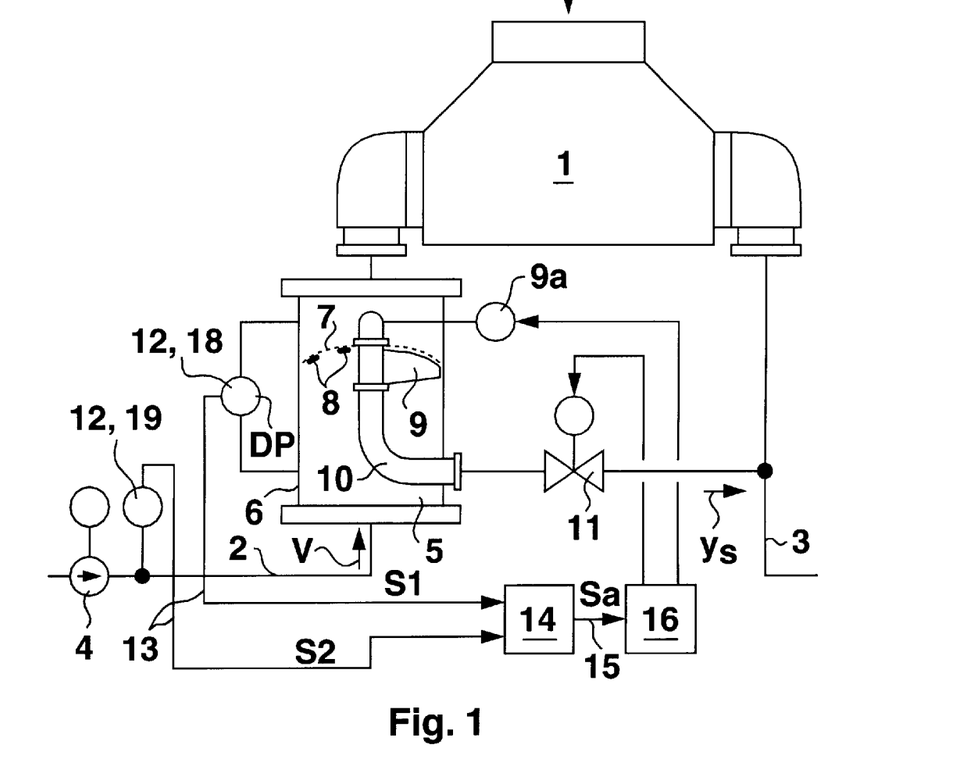

FIG. 1 shows a known whole installation with a regenerable mechanical filter for contaminants in the cooling water flow preceding heat exchangers as a flow diagram, with a heat exchanger (1), cooling water supply line (2), cooling water drainage line (3), cooling water pump (4) with drive motor, and filter (5). The filter (5) is composed of a filter housing (6), filter element (7), cleaning device (9) with a drive shaft and drive motor (9a), flush water line (10) and flush means (11). The installation is equipped with a pressure differential measuring system (18) and a cooling water volume flow measuring system (19) as the sensors (12) monitoring the operating condition of the installation, the signal lines (13) of which output electrical signals (S1; S2) and are connected to the flush command generator (14), which in turn is connected by means of its command line (15) to the flush process control (16) and makes the flush command (Sa) electrically switchable in order to flush the filter (5). Furthermore, the contaminants (8) which are held back by the filter element (7) are shown. The cooling water volume flow (V) and the flush water flow (Vs) are represented by arrows. It is evident, without any particular representation in the drawing, that by flushing the fouled filter (5), the pressure differential falls to the pressure differential of the clean filter (ΔPc) and afterwards, because of the concentration of contaminants (8) in the cooling water volume flow (V) increases again until it reaches the set flush time (ΔPs) after expiration of the total time period (ΔT1). The flush interval (ΔT2) is used for the flushing. During the total time period (ΔT1) the first power loss (ΔN1) increases as a result of increasing pressure loss (ΔP) of the filter (5) and the cooling water volume flow (V) reduced as a result of this as a sum of the change in power of the cooling water pump (4) and reduction in thermal output of the heat exchanger (1). During the flushing there is a second power loss (ΔN2) in the flushing interval (ΔT2) because of the diversion of the flush water flow (Vs) from the heat exchanger (1) as a sum of the change in power of the cooling water pump (4) and reduction in thermal output of the heat exchanger (1). Directly after completion of the flushing, with a clean filter (5) the first power loss (ΔN1) is again at its lowest value and afterwards increases again. In order to reduce the first power loss (ΔN1) as a result of increasing pressure loss (ΔP) of the filter (5), the flush time (ΔPs) could be set at a lower value. When, however, with this lower setting of the flush time (ΔPs) a higher concentration of contaminants (8) occurs, the flush time is reached earlier; the filter (5) flushes more often. With high concentrations of contaminants (8), the filter (5) flushes so frequently that a particularly high "power loss through filter flushing" occurs, which over-compensates for the lower "power loss through filter fouling". The lower setting of the flush time (ΔPs) would therefore bring no improvement, but instead a deterioration. The known method for controlling an installation for the mechanical cleaning of liquids with fixed setting of the flush time cannot take into consideration the periodically varying concentration of contaminants in the cooling water flow and therefore does not make it possible to have a setting of the flush time advantageous for all operation conditions, with low energy losses. The provision of the cooling water volume flow measuring system (19) in the installation shown in FIG. 1 also produces no improvement to the disadvantages described. It simply allows the flush time to be adjusted to different values of the cooling water volume flow (V). Such changes to the cooling water volume flow (V) are performed by the operating personnel in order to set the installation according to different load conditions and cooling water temperatures. Automatic adjustment of the flush time to different values of the cooling water volume flow (V) is desirable, for example, in order to avoid excess fouling of the filter element (7) with contaminants (8) when there is a low cooling water volume flow (V); with a low cooling water volume flow (V) a flush time (ΔPs) equally as high as when there is a high cooling water volume flow (V) is only obtained when the sieve element (7) is heavily fouled.

Figure 2:
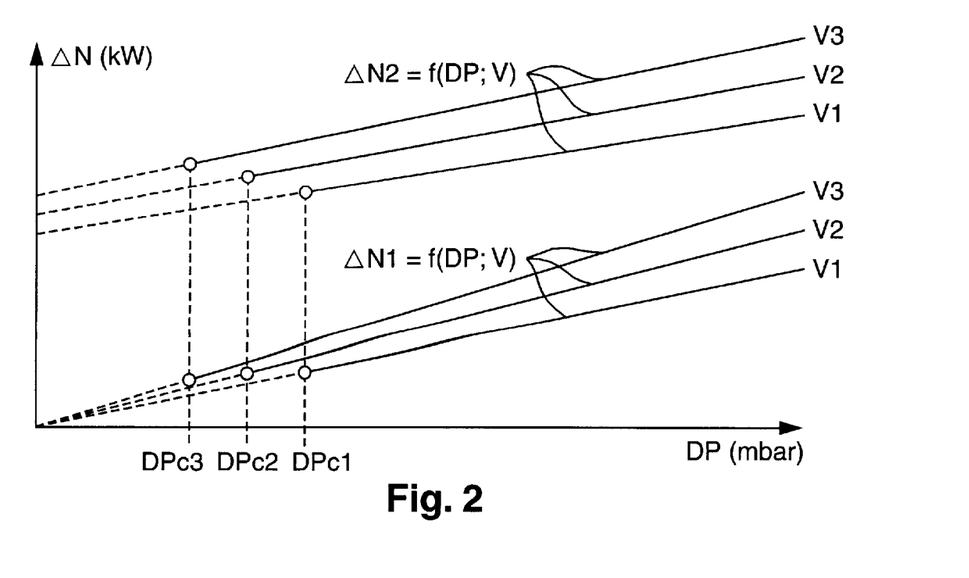

FIG. 2 represents, as an example for a preferred embodiment of the invention, the development of the first function (ΔN1=f(ΔP; V)) and of the second function (ΔN2=f (ΔP; V)) over the pressure differential (ΔP), wherein for simplification in this preferred embodiment, the determination and input for storage in the function memory (17) are given as straight lines (ΔN1=a*ΔP and ΔN2=b*ΔP+c) with V as the parameter. The first and second functions (ΔN1; ΔN2) are shown by way of example for three values of the cooling water volume flow (V1; V2; V3). Three pressure differential values (ΔPc1; ΔPc2; ΔPc3) are shown as the lowest possible pressure differentials occurring in the clean filter (5). The storage as straight lines makes a determination possible with little complexity, as a straight line through 2 points is established, and for determination according to this only 2 operating points with different pressure differentials are required. A further simplification is possible by means of a further preferred embodiment of the invention, in that the constants (a; b; c) are placed in a linear dependency to the cooling water volume flow (V), which is not shown. In total, only six constant values (d; e; f; g; h; i) are established for the determination of the first and second power losses (ΔN1; ΔN2) in this particular embodiment of the invention.

Figure 3:
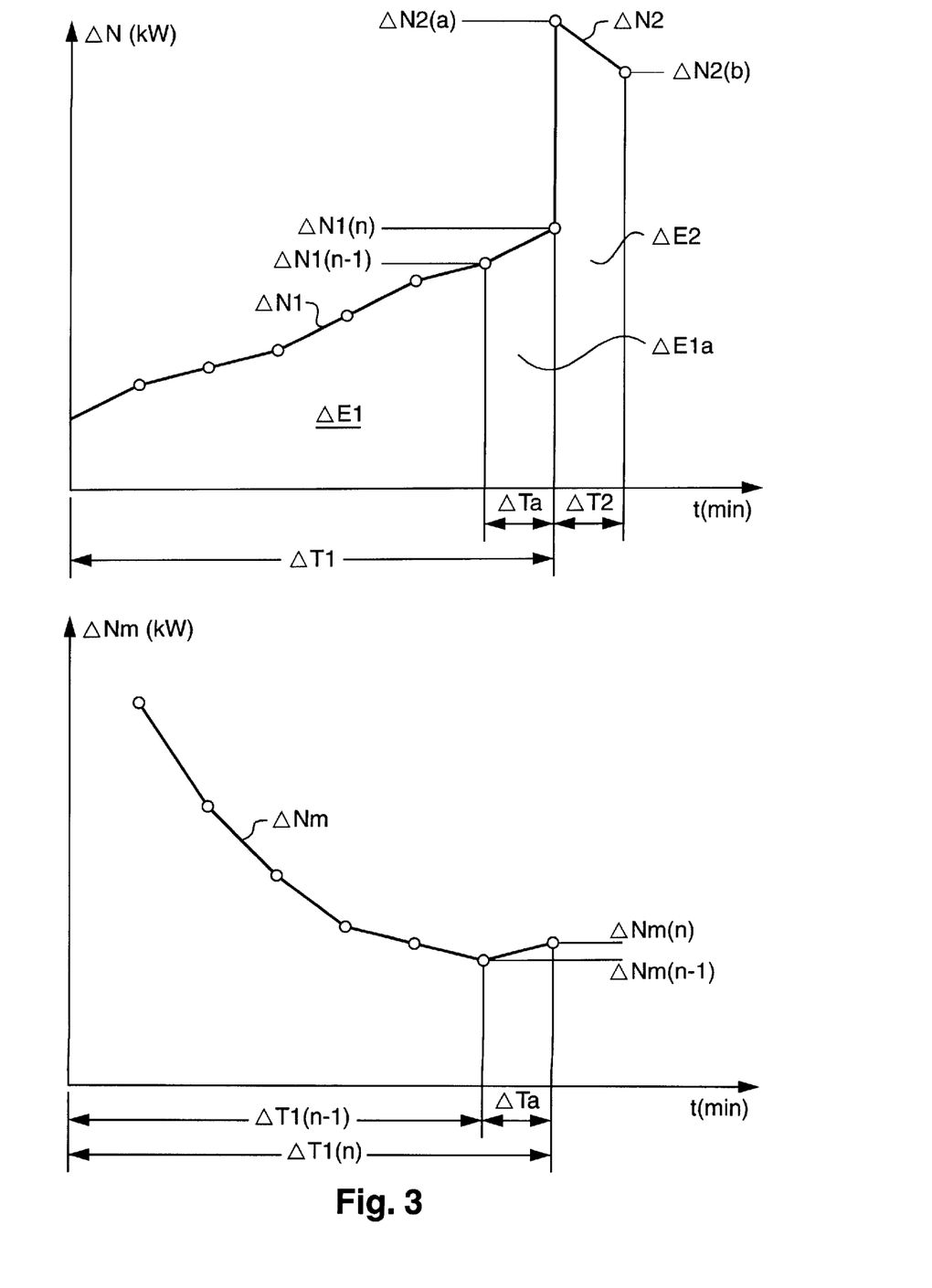

FIG. 3 shows the further steps of the method according to the invention. Here, the upper part of the diagram shows the development of the first and second power losses (ΔN1; ΔN2) over time (t) and the lower part of the diagram shows the development of the average power loss (ΔNm) over time (t). By means of a stored first function (ΔN1=f(S1, S2 . . . Sn)) and in each case at the end of a time interval (ΔTa), from a series of time intervals (ΔTa) firstly the current first power loss (ΔN1(n)) is calculated by evaluation of the current measurement signal (S1, S2 . . . Sn), then the current first energy loss (ΔE1a) in the time interval (ΔTa) caused by the fouled filter according to the formula ΔE1a=ΔTa*(ΔN1(n)+ΔN1(n−1))/2, as the area below the curve of the first power loss (ΔN1) over time (t). After this, by integration of all the current first energy losses (ΔE1a) occurring in the total time (ΔT1) since the last, previous flush process in several time intervals (ΔTa), the energy sum (ΔE1) is formed. After this, with the assumption that the filter (5) would be flushed at this current moment, by means of a stored second function (ΔN2=f (S1, S2 . . . Sn)) the current second power loss (ΔN2(a)) is determined at the beginning of the flush interval (ΔT2) by evaluation of the current measurement signal (S1, S2 . . . Sn) and assuming that the filter (5) will, at the end of the flush interval (ΔT2), reach the same value as the second power loss (ΔN2) at the beginning of the total time period (ΔT1), the associated current second power loss (ΔN2(b)) at the end of the flush interval. The second power loss (ΔE2) occurring during the flushing process in the flush interval (ΔT2) is determined as an area with the width of the flush interval (ΔT2) below the curve of the second power loss (ΔN2) over time (t) with the assumption that the filter (5) would be flushed at this time. The further steps of the method according to the invention for controlling an installation for the mechanical cleansing of liquids arc to form, in a manner which is not shown, the sum loss (SΔE) as the total energy loss inclusive of the energy expenses (Ex), which are not shown, and to calculate the average power loss (ΔNm) according to the formula ΔNm=SΔE/(ΔT1+ΔT2). The average power loss (ΔNm(n)) determined for the present total time period (Δt1(n)) is compared with the average power loss (ΔNm(n−1)) determined in the previous total time period (Δt1(n−1)) and the flush command (Sa) for flushing the filter (5) is activated when the condition ΔNm(n)>ΔNm(n−1) is satisfied. In the example shown, the minimum possible value for the average power loss (ΔNm) would be just reached and the flush command (Sa) given by means of the command line (15).

Figure 4:
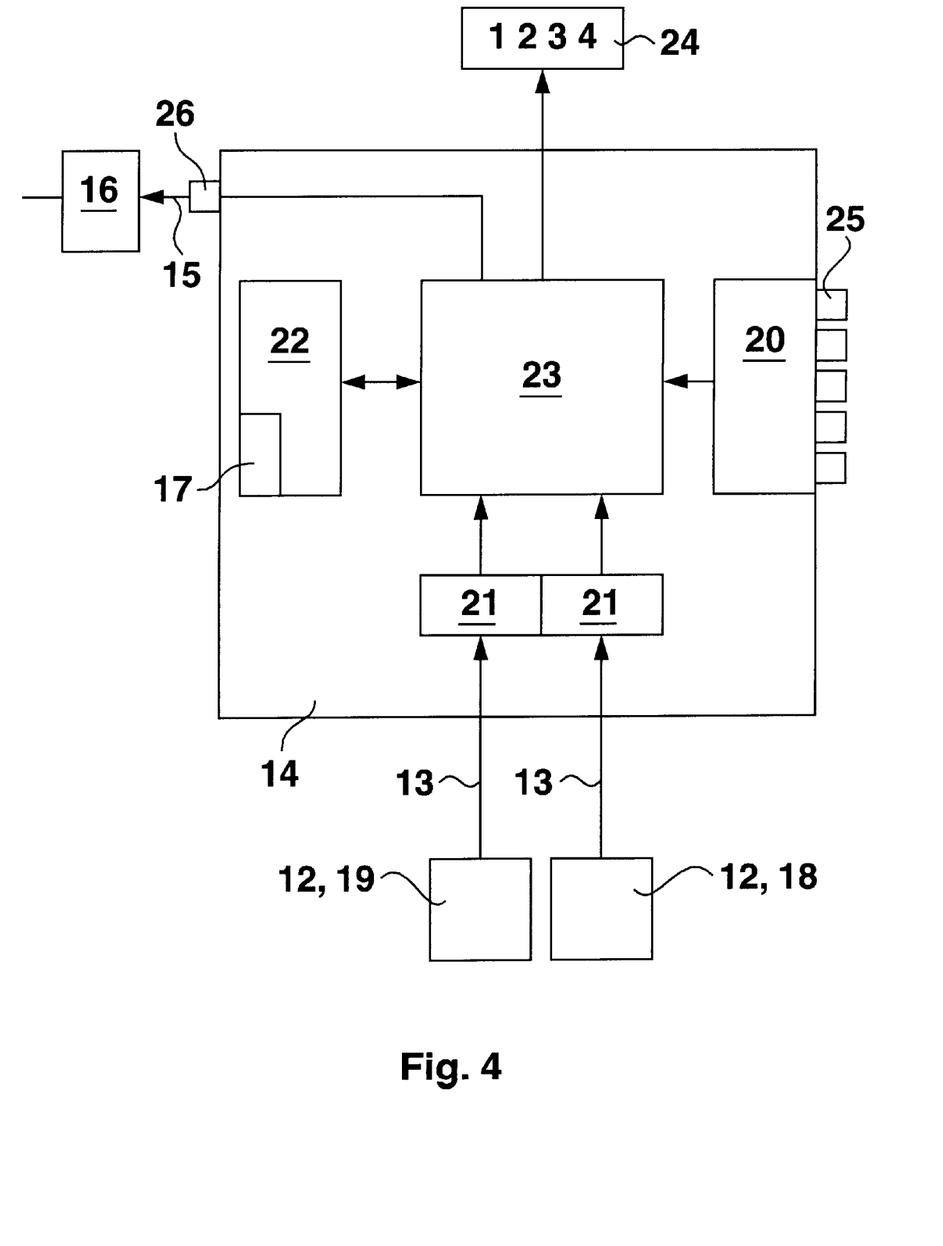

FIG. 4 shows a device according to the invention, simply representing an embodiment, for implementing the method. Two sensors (12) configured as a pressure differential measuring system (18) and a cooling water volume flow measuring system (19) are connected via signal lines (13) to the measured value input (21) of a flush command generator (14). The measured values (ΔP; V) are supplied via the measured value input (21) to a calculator (23) for calculating and for comparison of current first and second power losses ($\Delta N1(n)$; $\Delta N1(n-1)$; $\Delta N2(a)$; $\Delta N2(b)$), energy losses ($\Delta E1a$; $\Delta E2$), the energy sum ($\Delta E1$), the sum losses ($S\Delta E$) and the average power loss ($\Delta Nm$), and the total time period ($\Delta T1$), and for generating a flush command (Sa) via a signal output (26) to the command line (15) and control of a display (24), which is connected to a non-volatile memory (22) for pre-determined values of time intervals ($\Delta Ta$), flush intervals ($\Delta T2$), energy expenditure (Ex), monetary values (GW), servicing costs (W) and/or functional correlations of parameters, and in particular to a function memory 17 for the storage of the first and second power losses ($\Delta N1$; $\Delta N2$) as a function of the signals (S1, S2 . . . Sn). An input unit (20) for data has keys (25) for manual input. The display (24) is for checking the data input via the input unit (20) and for showing the operating condition of the filter, for example for showing the current average power loss ($\Delta Nm$).

An important component of the invention is that the method according to the invention calculates the development of the power loss ($\Delta N1$) caused by the fouling of the filter (5) since the last cleansing of the heat exchanger up to the present, that is to say in the past, and from this indicates the future. This happens with the assumption that the operating cycle completed with a filter flush behaves with respect to the development of fouling and the development of the cooling water volume flow over time in a similar manner to the next operating cycle after completed flushing. This is the best possible approximation to reality and a substantial component of the invention. A substantial component of the invention is also that the total spectrum of the varying operating conditions can be taken into account in a cost-orientated manner in the examination by means of the integration procedure according to the invention, with subsequent differentiation, which in the case of the monitoring of a simple current value of the pressure differential of the filter, normal according to the known prior art, is not possible.

Overall, by employing the method according to the invention for cost-orientated control of a regenerable mechanical filter for contaminants in the cooling water flow preceding heat exchangers, with low concentrations of contaminants in the cooling water flow there is a lower flush point and with higher concentrations a higher flush point, and thereby a manner of flushing corresponding to the occurrence of fouling with the lowest possible overall energy losses, on the one hand as a result of the filter fouling and on the other hand as a result of the filter flushing, is made possible. The device described makes possible the implementation of the method.

The method is not limited to employment for cleansing contaminants in the cooling water flow, nor to the embodiments of the filter described. Instead, it can be used for all fluids and all filters in which the contaminants collected produce an increase in pressure differential and during the flushing process a flow of flushing fluid is lost to the means connected and thereby from the process as a whole.

What is claimed is:

1. Method for controlling a mechanical filter which is regenerable by means of a flushing device and which is in a cooling water flow, driven by a cooling water pump, of a heat exchanger, the method comprising:
   a. sensing at least one measured value, from which a current degree of fouling of the filter can be deduced, and supplying the value to a flush command generator;
   b. calculating by at least one functional correlation stored in the flush command generator, at pre-determined time intervals respectively, a first ($\Delta N1$) and a second ($\Delta N2$) power loss, wherein the first power loss ($\Delta N1$) comprises the power loss in the output of the cooling water pump and in the thermal output of the heat exchanger and the increased energy consumption costs caused by the degree of fouling of the filter, and the second power loss ($\Delta N2$) comprises the power loss caused by a flushing procedure with a current degree of fouling;
   c. determining over intervals of time the first calculated power loss ($\Delta N1$) and its respective energy loss ($\Delta E1$) caused as a whole by the fouling of the filter since the last regeneration;
   d. calculating a current second energy loss ($\Delta E2$) respectively for a flushing procedure which comprises the second power loss multiplied by the duration of the regeneration ($\Delta T2$);
   e. adding the current calculated second energy loss ($\Delta E2$) to the respective current total energy loss ($\Delta E1$) accumulated, and dividing the sum by the time elapsed ($\Delta T1$) since the last regeneration inclusive of the time ($\Delta T2$) needed for a regeneration procedure;
   f. monitoring over interval of time of the quotient $[\Delta E1 + \Delta E2]/[\Delta T1+\Delta T2]$ and triggering a regeneration procedure when the quotient has passed through a minimum and is increasing again.

2. Method according to claim 1, wherein the functional correlation stored in a flush command generator takes into account a different degree of fouling of the filter and a cooling water volume flow when the filter is clean, as well as at least one measured value for determining one of the power losses.

3. Method according to claim 2, further comprising determining at least a cooling water volume flow over the filter as the measured value.

4. Method according to claim 3, further comprising storing the functional correlation as an approximate straight line, in dependency upon the cooling water volume flow.

5. Method according to claim 4, further comprising storing the functional correlation as an approximate straight line, in dependency upon the pressure differential.

6. Method according to claim 3, further comprising changing the functional correlation, when there are changes in the cooling water volume flow.

7. Method according to claim 4, further comprising storing the functional correlation as an approximate straight line, in dependency upon the pressure differential over the filter.

8. Method according to claim 4, further comprising changing the functional correlation.

9. Method according to claim 1, further comprising determining after a flushing procedure the cooling water volume flow.

10. Method according to claim 9, wherein said determining after a flushing procedure the cooling water volume flow is from at least one current and one stored measured value.

11. Method according to claim 1, wherein the filter is arranged between the cooling water pump and heat exchanger in the path of a cooling water supply line to the heat exchanger, further comprising:
   a filter housing at least one filter element covering the cross-section of the housing, at least one cleansing device acting upon the filter element and flushing away the contaminants and at least one flush water line which can be connected to a flushing means and is for removing the flushed out contaminants,
   at least one or more sensors monitoring for the operating condition of the installation having, single line with output signals (S1, S2 ... Sn) for indicating the deteriorated operating condition of the whole installation caused by the fouling of the filter wherein the installation is composed of a cooling water pump, a filter and a heat exchanger, a flush command generator which is on the one hand connected to the signal lines outputting the signals (S1, S2 ... Sn) and on the other hand to its command line, which makes the flush command (Sa) for flushing the filter switchable, a flush process control which is connected to the command line of the flush command generator and when there is a switch state signalling the flush command, the flush command makes the flushing process practicable by opening the flushing means and by actuating the cleansing device, the method further comprising:

a. determining a first power loss ($\Delta N1$) caused by the fouled filter as a result of increased pressure differential ($\Delta P$) and reduced cooling water volume flow (V) as the sum of the change in output of the cooling water pump and reduced thermal output of the heat exchanger, dependent upon signals (S1, S2 ... Sn) as variables, at different stages of fouling of the filter and with at least one operating value of the cooling water volume flow (V) as a parameter, and storage of the first power loss ($\Delta N1$) as the first function ($\Delta N1 = f(S1, S2 ... Sn)$) of the signals (S1, S2 ... Sn) in a function memory;

b. determining the second power loss ($\Delta N2$) which occurs during flushing of the fouled filter mainly because the flushing water flow (Vs) is lost from the heat exchanger, as the sum of the change in output of the cooling water pump and reduced thermal output of the heat exchanger, dependent upon the signals (S1, S2 ... Sn) as variables, at several different stages of fouling of the filter, and with at least one operating value of the cooling water volume flow (V) as a parameter, and storage of the second power loss ($\Delta N2$) as the second function ($\Delta N2 = f(S1, S2 ... Sn)$) of the signals (S1, S2 ... Sn) in a function memory;

c. determining, by means of the stored first function ($\Delta N1 = f(S1, S2 ... Sn)$) of the signals (S1, S2 ... Sn) and for the last time interval ($\Delta Ta$), from a series of combined time intervals (DTa), of the current first power loss ($\Delta N1(n)$) by evaluation of the current measured signal (S1, S2 ... Sn) and calculating the first energy loss ($\Delta E1a$) caused in the last time interval ($\Delta Ta$) by the fouled filter according to the formula $\Delta E1a = \Delta Ta*(\Delta N1(n)+\Delta N1(n-1))/2$, wherein the current first power loss $\Delta N1(n-1)$ applies at the beginning and the current first power loss $\Delta N1(n)$ at the end of the last time interval ($\Delta Ta$), and integrating all the current first energy losses ($\Delta E1a$) which have occurred in the total time period ($\Delta T1$) since the last, previous flushing process in several time intervals ($\Delta Ta$) as the sum energy ($\Delta E1$);

d. determining, by means of the stored second function ($\Delta N2 = f(S1, S2 ... Sn)$) of the signals (S1, S2 ... Sn), of the current second power losses ($\Delta N2(a)$; $\Delta N2(b)$) by evaluation of the current measured signal (S1, S2 ... Sn) and calculating the second energy loss ($\Delta E2$) caused during the flushing process in the flushing interval ($\Delta T2$) by current flushing of the fouled filter according to the formula $\Delta E2 = \Delta T2*(\Delta N2(a)+\Delta N2(b))/2$, with the assumption that the filter would be flushed at this time;

e. forming the sum loss (SAE) according to the formula $S\Delta E = \Delta E1 + \Delta E2 + Ex$ as the total energy loss for when the filter is flushed at this time, wherein Ex expresses the sum of the energy expenditure for actuating the flushing means and cleansing device and the servicing costs (W) for the filter which occur due to a flushing cycle, wherein the monetary value (GW) of the costs are expressed as an energy loss;

f. calculating the average power loss ($\Delta Nm$) according to the formula $\Delta Nm = S\Delta E/(\Delta T1+\Delta T2)$ for the period from the sum of the total period of time ($\Delta T1$) and the flushing interval ($\Delta T2$);

g. comparing the average power loss ($\Delta Nm(n)$) determined for the total period at that time ($\Delta T1(n)$) with the average power loss ($\Delta Nm(n-1)$) determined in the previous time period ($\Delta T1(n-1)$) and activating the flush command on the command line for flushing the filter when the condition $\Delta Nm(n) > \Delta Nm(n-1)$ is satisfied, otherwise, without current flushing, new examination of the condition $\Delta Nm(n) > \Delta Nm(n-1)$ for the subsequent total time period ($\Delta T1(n+1)$).

12. Method according to claim 11, further comprising:

a. using the pressure differential ($\Delta P$) of the filter determined by means of a pressure differential measuring system (18) as the signal (S1) which indicates the operating condition of the whole installation composed of a cooling water pump, filter and heat exchanger impaired by the fouling of the filter, b. determining the first power loss ($\Delta N1$) and the second power loss ($\Delta N2$) dependent on the pressure differential ($\Delta P$) of the filter as variables, at several different stages of fouling and with at least one operating value of the cooling water volume flow (V) as a parameter and storing in the function memory (17) as first and second functions ($\Delta N1 = f(\Delta P, V)$; $\Delta N2 = f(\Delta P, V)$) with V as a parameter, wherein the values of the parameter V characterise the cooling water volume stream when there is a clean filter, c. calculating the current first power losses ($\Delta N1(n)$; $\Delta N1(n-1)$) and current second power losses ($\Delta N2(a)$; $\Delta N2(b)$) with the current pressure differential ($\Delta Pa$) by means of the stored first and second function ($\Delta N1 = f(\Delta P; V)$; $\Delta N2 = f(\Delta P; V)$).

13. Method according to claim 11, further comprising:

a. determining the pressure differential ($\Delta P$) of the filter by means of a pressure differential measuring system and using the cooling water volume flow (V) determined by means of a cooling water volume flow measuring system as the signals (S1; S2) which indicate the operating condition of the whole installation composed of a cooling water pump, filter and heat exchanger impaired by the fouling of the filter;

b. determining the first power loss ($\Delta N1$) and the second power loss ($\Delta N2$) dependent on the pressure differential ($\Delta P$) of the filter and the cooling water volume flow (V) as variables, at several different stages of fouling and with at least one operating value of the cooling water volume flow (V) as a parameter and storing a result in the function memory as first and second functions ($\Delta N1 = f(\Delta P, V)$; $\Delta N2 = f(\Delta P, V)$);

c. and calculating the current first power losses ($\Delta N1(n)$; $\Delta N1(n-1)$) and current second power losses ($\Delta N2(a)$; $\Delta N2(b)$) with the current pressure differential ($\Delta Pa$) and the current cooling water volume flow (Va) by means of the stored first and second function ($\Delta N1 = f(\Delta P; V)$; $\Delta N2 = f(\Delta P; V)$).

14. Method according to claim 11, further comprising storing the first and second functions ($\Delta N1 = f(\Delta P; V)$;

$\Delta N2=f (\Delta P; V))$ as approximately straight lines having the form $\Delta N1=a*\Delta P$ and $\Delta N2=b*\Delta P+c$, wherein the constants a, b and c have to be placed in a linear dependency with respect to the cooling water volume flow (V), having the form $a=d-e*V$ and $b=f-g*V$ and $c=h-i*V$, wherein d, e, f, g, h and i are constant values.

15. Method according to claim 1, further comprising adding to the sum of the total energy loss ($\Delta E1+\Delta E2$) an energy loss (Ex) which corresponds to the energy expenditure for operating the flushing device to servicing costs which occur due to a flushing cycle, wherein the monetary value of the costs are expressed as an energy loss.

16. Method according to claim 1, further comprising determining at least one pressure differential over the filter.

17. Method according to claim 1, further comprising inputting a change to the cooling water volume flow (V) for the clean filter by means of an input unit.

18. Method according to claim 1, further comprising determining changes to the cooling water volume flow (V) by evaluation of the change in pressure differential of the clean filter ($\Delta Pc$) in each case directly after completion of the flushing process, according to the relation current V/reference V=(current $\Delta Pc$/reference $\Delta Pc)^{0.5}$ wherein the term "reference" describes a reference state with known operating values for the pressure differential of the clean filter ($\Delta Pc$) and the cooling water volume flow (V), and the term "current" describes a current condition with measured pressure differential of the clean filter $\Delta Pc$) and unknown cooling water volume flow (V).

19. Method according to claim 1, further comprising using the method within the framework of control.

20. Device for controlling a mechanical filter which is regenerable by means of a flushing device and which is in a cooling water flow driven by a cooling water pump of a heat exchanger, wherein said device comprises the following components:
- a flush command generator with an input unit and non-volatile memories for functional correlations of parameters,
- at least one sensor for receiving measured values from which, at predetermined intervals, respectively a first power loss ($\Delta N1$) which is caused by the fouling of the filter can be calculated as a change in output of the cooling water pump and as a change in output of the heat exchanger,
- means for calculating the total energy loss ($\Delta E1$) calculated from the first power losses ($\Delta N1$) over intervals of time since the last regeneration of the filter,
- means for calculating the current energy loss ($\Delta E2$) to be expected to be caused by a regeneration procedure as a change in output in the cooling water pump and as a change in output of the heat exchanger,
- means for recognising when the current sum of the total energy loss ($\Delta E1$) and of the energy loss ($\Delta E2$) expected with a regeneration divided by the time since the last regeneration inclusive of the regeneration time ($\Delta T1+\Delta T2$) to be expected has reached a minimum or has exceeded it, and for triggering a regeneration process resulting from this.

21. Device according to claim 20, wherein the input unit is provided with a keyboard for inputting values of monetary value factors and energy costs.

22. Device according to claim 20, comprising:
- a sensor for producing measured values (S1, S2 . . . Sn) from which current first and second power losses ($\Delta N1(n)$; $\Delta N1(n-1)$; $\Delta N2(a)$; $\Delta N2(b)$) can be determined in the flush command generator,
- a flush command generator with an input unit for data and at least one measured value input, wherein
- in the flush command generator there are provided non volatile memories for pre-determined values of time intervals ($\Delta Ta$), flush intervals ($\Delta T2$), energy expenditure, monetary values for actuating the flushing means (GW), servicing costs (W) and functional correlations of parameters and in particular a function memory for the storage of the first and second power losses ($\Delta N1$; $\Delta N2$) as functions of the signals (S1, S2 . . . Sn), and
- the flush command generator has a calculator unit for calculating and for comparison of current first and second power losses ($\Delta N1(n)$; $\Delta N1(n-1)$; $\Delta N2(a)$; $\Delta N2(b)$), of the energy losses ($\Delta E1a$; $\Delta E2$), of the sum energy ($\Delta E1$), of the sum loss (S$\Delta E$) and of the average power loss ($\Delta Nm$) of the total time period ($\Delta T1$) and for generating a flush command (Sa) a command line and control of a display means (24),
- the command line for transmitting the flush command (Sa) to the flush process control,
- a display means to display the operational status of the device for cost-orientated control of a regenerable mechanical filter and for examining the data input and for display of the current average power loss (ANm) and other calculated values and,
- a flush process control.

23. Device according to claim 20, further comprising:
- a sensor having a pressure differential measuring system for measuring the current pressure differential ($\Delta Pa$) of the filter element,
- a function memory for storage of the first and second functions ($\Delta N1=f (\Delta P, V)$; $\Delta N2=f (\Delta P, V)$).

24. Device according to claim 20, further comprising:
- a sensors having a pressure differential measuring system for measuring the current pressure differential ($\Delta Pa$) of the filter element and a cooling water volume flow measuring system for measuring the current cooing water volume flow (Va),
- a function memory for storage of first and second functions ($\Delta N1=f (\Delta P,V)$; $\Delta N2=f (\Delta P, V)$).

25. Device according to claim 15, wherein the means (23) for calculating the current energy loss ($\Delta E2$) also converts the operating and servicing costs of the filter (5) which occur due to a flushing cycle into a respesentative energy loss (EX).

26. Device according to claim 20, wherein said at least one sensor (12; 18; 19) for receiving measured values is a pressure sensor.

* * * * *